United States Patent
Karayel

(10) Patent No.: US 8,032,517 B2
(45) Date of Patent: Oct. 4, 2011

(54) METHOD FOR THE AUTOMATIC EVALUATION OF THE SIMILARITY OF TWO CHARACTER STRINGS THAT ARE STORED IN A COMPUTER

(75) Inventor: Emin Karayel, Pforzheim (DE)

(73) Assignee: Omikron Data Quality GmbH, Pforzheim (DE)

( * ) Notice: Subject to any disclaimer, the term of this patent is extended or adjusted under 35 U.S.C. 154(b) by 355 days.

(21) Appl. No.: 12/227,996

(22) PCT Filed: Jun. 18, 2007

(86) PCT No.: PCT/EP2007/005347
§ 371 (c)(1),
(2), (4) Date: Dec. 4, 2008

(87) PCT Pub. No.: WO2007/144199
PCT Pub. Date: Dec. 21, 2007

(65) Prior Publication Data
US 2009/0171947 A1    Jul. 2, 2009

(30) Foreign Application Priority Data
Jun. 16, 2006 (DE) .......... 10 2006 029 072

(51) Int. Cl.
*G06F 17/30* (2006.01)
(52) U.S. Cl. ...................................... 707/713
(58) Field of Classification Search ............ 707/2, 5, 707/713; 717/168
See application file for complete search history.

(56) References Cited

U.S. PATENT DOCUMENTS

| | | | |
|---|---|---|---|
| 4,833,610 A | 5/1989 | Zamora et al. | |
| 5,606,690 A | 2/1997 | Hunter et al. | |
| 5,978,797 A | 11/1999 | Yianilos | |
| 6,425,125 B1* | 7/2002 | Fries et al. | 717/168 |
| 2009/0049028 A1* | 2/2009 | Senthil | 707/5 |

OTHER PUBLICATIONS

Esko Ukkonen, "Approximate String Matching with q-Grams and Maximal Matches", Theoretical Computer Schience 92 (1992) 191-211, Amsterdam, NL.
Patrick A.V. Hall, et al., "Approximiate String Matching", ASM Computing Surveys, ACM, vol. 12, No. 4, Dec. 1980, ACM, New York, New York.
Gonzalo Navarro, "A Guided Tour to Approximate String Matching", ACM Computing Surveys, vol. 33, No. 1, Mar. 2001, pp. 31-88, ACM, New York, New York.
Samuel R. Buss, et al., "A Bipartite Matching Approach to Approximate String Comparison and Search", Tech. Rep., NEC Research Institute, [Online] 1995, XP002452856, Princeton, NJ.

* cited by examiner

*Primary Examiner* — Etienne P LeRoux
(74) *Attorney, Agent, or Firm* — Walter A. Hackler

(57) ABSTRACT

The invention describes a computer-aided method for automatically valuating the similarity of two character strings which are stored in a computer or to which the computer has access via an interface. First of all, associations which are present in the character strings are sought using a specification stored in the computer. The sought associations are then valuated using a first rule stored in the computer, with cohesive associations—subsequently also referred to as association strings—being given a higher valuation for the similarity of the character strings than non-cohesive associations. Finally, a second rule stored in the computer is used to derive a value, particularly a numerical value, from the valuation of the sought associations as a measure of the similarity of the two character strings.

20 Claims, 1 Drawing Sheet

Figure 1:
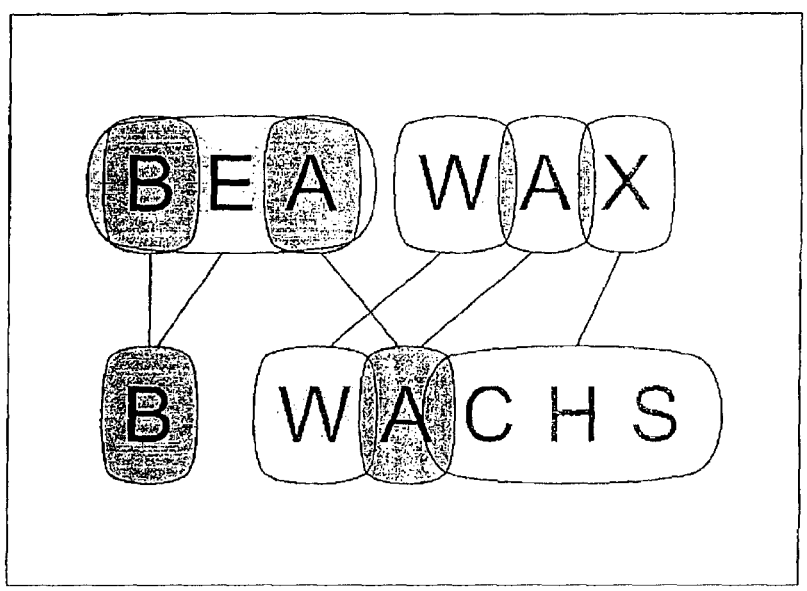

METHOD FOR THE AUTOMATIC EVALUATION OF THE SIMILARITY OF TWO CHARACTER STRINGS THAT ARE STORED IN A COMPUTER

The invention relates to a method for the evaluation of the similarity of two character strings. The invention relates especially to a computer-aided method for the automatic evaluation of the similarity of two character strings that are stored in a computer or to which the computer has access by means of an interface.

The problem to compare character strings and to evaluate their similarity arises, e.g., in the research of nucleic acid sequences. If, by way of example, the genetic material of a pathogenic agent was fully or at least partly decoded, it is of importance to find out whether or not previously studied pathogens contained these same or similar gene sequences or nucleic acid sequences, respectively. Since pathogens frequently mutate, it is of special importance to find similar pathogens and to find out their degree of similarity. This is of special importance in the case of rapidly mutating pathogens such, as, e.g., flu-causing pathogens.

The task to compare character strings and to evaluate their similarity also arises from the search for terms in a text in order to choose one or more specific documents from a multitude of documents. By way of example, this task arises also when verifying whether or not a certain name or a certain address is in a large name file or address file such as, e.g., in a customer list of a business. Finally, the task arises, e.g., in the area of storage and logistics when it deals with finding out whether a certain item is offered or is in stock and/or whether identical items but under different but similar descriptions are offered or in stock. Generally, the task arises when it is a question to verify whether a certain data set, which can be represented as a character string, is within a large data volume that is stored e.g. in a in a data bank of a computer.

This entails the requirement that the method finds not only identical character strings, as required in the area of storage and logistics, but also similar character strings since, e.g., names and addresses could be present in a different notation or be incorrectly written.

From EP 0 271 664 A1 is known a method that determines the number of steps required in order to transfer one character string into another character string. In this method, a character is either inserted, removed or replaced. The number of steps is normalized to the length of the character string in order to obtain a size for the similarity or the dissimilarity of the two character strings. If a given character string is successively compared with several character strings in such a manner, a ranking list regarding the similarity or dissimilarity can be established.

From EP 0 639 814 B1 it is known how to determine differences when comparing two character strings according to given rules, to assign a numerical value to these differences, to weight the various numerical values, and to add them in a weighted manner. Therefrom results a numerical value that is a measure for the dissimilarity of the two character strings. By comparing a character string with another character string one obtains a number of such dissimilarity values which can be compiled into a ranking list.

A disadvantage of the known methods is that they are too inaccurate. By way of example, they do not consider any transpositions such as, e.g., John Smith and Smith John.

SUMMARY OF THE INVENTION

The object of the present invention is to provide a method for the evaluation of two character strings that are stored in a computer or which the computer can access by means of an interface; the method shall be carried out automatically and provide more accurate results than in prior art as disclosed by EP 0 271 664 A1 and EP 0 639 84 B1.

This problem is solved by a method with the features set forth in claims 1 or 2. Other advantageous embodiments of the invention are object of the dependent claims.

In accordance with the invention, two character strings are compared to each other by determining at first the associations contained in the character strings. Then the associations are evaluated. The evaluation is carried out according to a first rule that is stored in the computer. For this purpose, to each of the associations can be assigned, e.g., a numerical value. Associations that are cohesive, i.e., that they form a string of associations, are given a higher evaluation of similarity of the two character strings to be compared than non-cohesive associations. According to a second rule, stored in the computer, from the value of the individual associations is formed a total value as measure for the similarity of the two character strings.

In the simplest case of the second evaluation rule, the numerical values of the individual associations are added. The sum is then a measure for the similarity of the character strings. In order to be able to compare different similarities, the sum of the values is preferably normalized in such a manner that in the case of matching character strings it is assigned a fixed value, preferably the value 1, while in the case of divergent character strings, the normalized similarity is assigned values between 0 and 1.

The value that is a measure for the similarity of the two character strings can be stored in the computer and/or it is output by the computer. Generally, a character string will not be compared with only one character string but rather with a series of successive character strings. In such a case, the values, especially the numerical values, that are a measure for the similarity of two character strings each, are sorted and stored and/or they are output in a tabular manner according to the degree of the similarity. It is also possible and in many cases sufficient and clearer not to output all the results but to output, e.g., to print or to display on a monitor, only those character strings for which the value, especially the numerical value of the similarity exceeds a predetermined threshold value.

The ascertained values of the similarity can be further processed in different manners. Thus, the character strings, in which the numerical value of the similarity exceeds a predetermined threshold value, can be manually evaluated. However, it is also possible that the computer, which has performed the evaluation, conducts further steps with the character strings in which the numerical value of the similarity exceeds a threshold, such as, e.g., treating the similar character strings as if they had the same contents, so-called duplicates. Then the computer can rid a data bank that contains the found duplicates of the character strings with the same content, so that it does not longer contain any duplicates.

DETAILED DESCRIPTION

The method of the invention determines the matches between each two character strings instead of the deviations between the character strings and evaluates same. Through the evaluation of associations, it is possible to consider more preponderantly the matches that are of special importance for the similarity. In particular, association strings are evaluated to a greater extent than an isolated conformity of individual characters because it is possible that the latter is merely accidental. By applying the invention, one obtains more meaningful results than with methods that are disclosed in prior art.

By a character is understood a letter, a digit of a number or a symbol of a character set of a language. In particular, by character is understood a grapheme in the sense of the Unicode-Standard that, e.g., is explained in the reference [1] (c.f. Unicode Standard Annex #29) or ISO 10646, respectively. Special characters, control characters, punctuations, and empty spaces are also considered characters.

By character string is understood a series of characters. A character string can consist of a series of words and numbers, as it is the case with names and addresses.

A data set contains at least one character string and it can contain other data that are assigned to a character string, especially data that are associated with the character string, e.g., in a meaningful context. A preferred example of a data set is the content of one line of a table.

A data volume contains several data sets. A preferred example of a data volume is a data bank.

By character substring is understood a part of a character string that consists of a single character or of directly successive characters.

By association is understood a pair of character substrings that cannot reasonably be fractionized further and that occur in the two character strings to be compared. A letter that occurs in both character strings constitutes an association. An association is also formed by phonetically homologous but differently written sounds such as "c" and "k" or "ph" and "f", when one of the sounds (e.g., ph) occurs in one of the character strings and the other phonetically homologous sound (e.g., f) occurs in the other character string. Synonyms and abbreviations that occur with the same meaning in the two character strings to be compared such as, e.g., Saturady and Sabbath, Nr. and No., Str. and Street, are also considered associations. In accordance with the foregoing definition, an instruction is stored in the computer according to which, because of the comparison, the computer compares two character strings and, within the sense of the above definition, finds the associations contained in the character strings.

Two associations are cohesive when in both character strings to be compared one of the associations ends where the next one begins. Position pairs at which ends one association and where the next one begins are designated as bridge positions. Cohesive associations constitute an association string.

By fragment is understood every association and any association string in two character strings to be compared. Since fragments can be of any length, either long or short, an association that consists merely of two separate matching characters does also constitute a fragment. Example: Should two character strings to be compared contain concurrently the association string "one," the below six fragments can be formed therefrom:

| | |
|---|---|
| "o" - | "o" |
| "n" - | "n" |
| "e" - | "e" |
| "on" - | "on" |
| "ne" | "ne" |
| "one" | "one" |

By similarity of associations for the respective association is understood a predetermined numerical value from a given range of values, appropriately from the range of 0 (no similarity) to 1 (identity).

By position of a character is to be understood its position within a character string. The existing positions in a character string are consecutively numbered so that for each character in a character string a numbered position indicates unequivocally its position in the character string. For the ascertaining of the similarity of two character strings, the fragments are assigned to the positions that the characters constituting the fragments occupy in the two character strings.

The weight of a position is a numerical value assigned to a position. The manner of weighting is preferably a component of the evaluation rule stored in the computer. By the weight of a position it can be expressed that for the similarity of two character strings the conformity in some positions is more important than in others. The weight is a measure for the relevance of a position for the similarity. In the simplest case, all positions are weighted the same. It is however more favorable to greater weight those positions that are of more significance for the similarity than other positions. The weight can depend on the characters that are in the positions. The matching of characters such as, e.g., "x" and "j" is of more importance for the evaluation of the similarity of two character strings than the matching of other characters such as, e.g., "e" and "n." The weight of a position can depend on which characters are on the previous and/or on the following positions of a character string, whereby the immediately adjacent position is of special importance for the weighting.

Example

In the character string "Kunz and Kohn" the characters "a," "n" as well as "d" in the word "and" could be of lesser weight than in the character string constituted by the words "Kunz" and "Kuhn." However, one could also introduce a character-specific weighting and multiply these two weightings by each other. Blanks and punctuations are simply weighted with 0. Then it does not matter whether one of the two character strings contains more blanks than the other. Blanks and punctuations are, however, of importance for the evaluation of the similarity of two character strings since the value of associations is preferably made dependent on the order of the associations in the character strings and thus on its position with respect to eventual blanks and punctuations in the character strings, in particular for the recognition of the beginnings and the ends of words. Fragments, that constitute the beginning or the end of a word, thus being at the beginning of a character string, at the end of a character string or immediately next to a blank or between two blanks, are preferably of greater weight than other fragments for the evaluation of the similarity.

The weights to be used can be formed from empirical values and stored in a data bank in a computer, which can be accessed by the computer when evaluating the character strings according to the stored benchmark rule. By way of example, the data bank can contain for each character of a character string a specific weight for the pertinent character, wherein characters such as "e" and "n" are preferably weighted below average, characters such as "q," "j," "x", and special characters are preferably weighted above average and blanks are assigned a weight of zero. The data bank can also contain modified weights for those characters that depend on which position the character occupies in the character string and/or which characters are at adjacent positions, whereby the adjacent blanks and punctuations are of special significance. The data bank can also contain weights for character substrings that most of the times are either of less importance for the similarity of two character strings and, therefore, are weighted below average or are more important and are therefore weighted above average, whereby appropriate weights can be obtained from empirical values or by estimating.

Examples of less important character substrings are "and," "en," "ein." Examples of more important character substrings are "tz," "ax," "ck," or "str."

By the value of an association is understood its weighted similarity with regards to the two character strings in which the association occurs. The weight is a factor that is multiplied by the numerical value of the similarity. Should the association consist of a character sequence occurring in one of the two character strings, the weights of the positions that constitute the associated character sequence are preferably added. In this case, the value of the association is the similarity of the association multiplied by the sum of the weights of the positions assigned to the association.

By isolated value of a fragment is to be understood the sum of the values of an association.

By adapted value of a fragment is to be understood a value possibly increased or decreased with respect to the isolated value whereby the increase or the decrease depends on the position of the fragment in the character string.

By total weight is to be understood the sum of the weights of the positions of two character strings to be compared.

By similarity of two character strings is to be understood a total value constituted by the values of their not overlapping fragments, preferably the sum of the adapted values of their not overlapping fragments, preferably divided by the total weight. If the similarity is understood in such a manner, the determination of the similarity of two character strings can be mathematically understood as a weighted set packing problem in which it deals with seeking not overlapping subsets in a finite set. In particular, the determination of the similarity of two character strings can then be understood as a mathematical solution of a weighted set packing problem in which it deals with finding in a finite set a selection of not overlapping subsets with the highest total weight. Applied to the determination of the similarity of two character strings this means that in the case of the weighted set packing problem it deals with finding from the number of fragments, that can be formed with the two character strings, a selection of not overlapping fragments, that result in the best possible numerical value for the similarity of the two character strings. This aim can be obtained with an embodiment of the method according to the invention that prefers the forming of longer fragments rather then the forming of shorter fragments.

In general, the weighted set packing problem can be exactly solved only in very few instances because the effort for the mathematical solution of the problem increases in an exponential manner with the number of the possible subsets. Mathematics, however, offer the expert various approximation possibilities by means of which he can solve by approximation the weighted set packing problem.

One of the possibilities is to apply Greedy algorithms. By means of a heuristic, they add new associations step by step. For the carrying out of the present invention, it is best to prefer those associations that form the longest possible fragments. Furthermore, it is possible to prefer associations that are valued the highest, especially those that compete with the fewest possible other associations.

The weighted set packing problem can be also solved with state-space-search algorithms. These are methods that traverse the entire solution set whereby certain upper estimates are made in order to omit decision subtrees; i.e., when a current solution would not lead to anything better than the best solution already found, one returns in the algorithm and tries another variant. In order to speed up the search, the algorithm can also be conducted in such a manner that an incorrect estimate is knowingly used, insofar as possible better solutions are excluded which are only slightly better solutions. This variant of the state-space-search algorithm results in an interval for the similarity, which must contain the exact solution. References [2] and [4] deal with the state-space-search algorithms.

Finally, the weighted set packing problems can be transferred by omitting the integrability condition into a linear optimization problem—cf. reference [3]—and solved, e.g., by applying the simplex algorithm—cf. references [4] and [5]. This type of approximation, when compared to the above mentioned methods, has the advantage that the results are very consistent, i.e., that approximation defects do not produce unforeseen results. Combinations of the mentioned mathematical methods are also possible. Thus, e.g., a result found with the aid of a Greedy algorithm can subsequently be improved by applying a simplex algorithm.

For the similarity of two character strings, special weight is assigned to fragments when character strings do not coincide but have the same meaning, e.g., in the case of character strings that merely differ because of spelling mistakes or in the case of character strings in which only the sequence of words is transposed such as, e.g., the sequence of surname and first name, or addresses in which the zip code is sometimes written with or without country designation, or if a post office box is given in addition to the name of the street and the house number.

The preference for coherent association over non-coherent associations is preferably carried out in such a manner that the character strings to be compared for the evaluation of their similarity are constituted by as few associations as possible and the rest by characters of which no associations can be formed. It is especially recommended to constitute the character strings to be compared for the evaluation of their similarity by as few associations as possible and the rest by characters of which no associations can be formed. This is a good prerequisite for the carrying out of the aforementioned mathematical method. In order to carry it out, to each association is advantageously assigned a numerical value as measure for the similarity of their associated components, especially one from the value range from 0 to 1 or from 0 to 100%. Therein, the value "0" means that there is no similarity and the value "1" or 100% means identity.

Preferably, associations are weighted depending on their importance for the similarity of character strings. The type of weighting is a component of the evaluation rule stored in the computer.

In an advantageous further development of the method according to the invention, the weight that is assigned to a fragment depends on its position in the character string. Preferably, fragments that form either the beginning or the end of a word are assigned a higher weight than fragments that are in the middle of a word.

Characters that do not belong to an association or a fragment are advantageously assigned a weight of "0" because of their lack of similarity with other characters of the character string but can be taken into consideration for the ascertaining of the entire weight. Should this be done, the value of the similarity is as larger as greater are the matches in relationship to the entire length of the character string. If for the evaluation of the entire weight one does not consider the characters that do not belong to an association or to a fragment, the matches in the two character strings determine to a greater extent the numerical value of the similarity in the sense of a grater similarity. This makes it easier to recognize the meaning of compound terms such as, e.g., "office swivel chair" and "office chair", as a match. Thus, for the determination of the entire weight, it is preferable to consider only slightly or not at all the characters in two character strings to be compared that do not belong to an association or to a fragment.

Weights of the associations and fragments and additions to and deductions from same are preferably formed according to empirical values, whereby the criterion is whether by changing the weights, additions or deductions one obtains more meaningful results and/or shorter calculating times.

Characters that have or can have the same phonetic, symbolic or contents-wise meaning are preferably deemed matching or similar and their position in the character string is correspondingly weighted. Association strings contained in the character strings are advantageously evaluated taking into consideration the values of the associations contained therein. The sum of the values of the associations contained in the character strings is advantageously considered in the evaluation of an association string. In the process, for an association positioned either at the beginning or at the end of an association string, it is preferable to effectuate a deduction in the evaluation. The shorter the association string the greater the effect of this deduction on the value of an association string. Thus, the deduction leads to that longer association strings, as intended according to the invention, are preferred to shorter association strings and non-cohesive associations.

It is further preferred to increase or decrease the value of a fragment depending on its position in the character string. A fragment that constitutes the beginning or the end of a word in at least one character string is preferably higher evaluated for the similarity of the character string than a fragment that does not constitute the beginning or the end of a word in the character string. Particularly high are preferably evaluated those fragments that constitute the beginning or the end of a word in both character strings and higher than fragments that constitute the beginning or the end of a word in only one of the character strings. Experience has shown that with such an evaluation, that takes into consideration the position of the fragment in the character strings, one can obtain better results.

The positions of characters that do not form part of any association or fragment are advantageously weighted "0" because they do not contribute to the similarity but must be considered for the determination of the entire weight.

As example of the second evaluation rule, values of the fragments or associations and association strings, respectively, preferably determined according to claim 4 or claim 5 are summed as numerical values of the similarity of the character strings. In order to obtain comparable assertions they are normalized in such a manner that in the case of matching character strings they are assigned a fixed value, preferably the value 1. Preferably, the sum of the values of the fragments is normalized by dividing it by the entire weight.

The invention is not limited to compare character strings that are constituted by characters of the same character set, e.g., the German or the English character sets. Preferably, characters that have or can have the same phonetic or symbolic meaning in different character sets are deemed as matching or similar. For this purpose, the characters are preferably converted to Unicode characters or to characters of the character set according to ISO 10646. On this basis, by means of the method of the invention it is possible to determine matches and similarities between any character sets such as, e.g., German and Arabic or English and Japanese.

The method according to the invention offers many interesting applications.

According to an advantageous development of the invention, a first data set in a first data volume, which data set contains a first of two character strings that are similar according to a predefined criterion, is supplemented by data from a second data set that contains the second of the two similar character strings and that is contained in a second data volume. The two data volumes may be data banks. The data sets may each be, e.g., the content of a line in a table. Each of the character strings to be compared can constitute a data set but they can also be part of a data set such as, e.g., a line of a table. With this development of the invention, the first data volume can be automatically increased with data that originate from the second data volume, e.g., from the second data bank, and that previously were not contained in the first data bank. By way of example, the data volumes can be data banks that contain customer lists. The first data bank contains, e.g., the names and addresses of customers while the second data bank contains the names and telephone numbers of customers. In the case of matching or highly similar names that occur in both data banks, with the method according to the invention it is possible to transfer the telephone numbers from the second data bank to the first data bank completing the latter by applying the telephone numbers to the appropriate names in the corresponding data sets in the first data bank. The similarity search can be effectuated, e.g., by surnames and first names and/or company names. Subsequently, these form the character strings that are to be compared.

Another development of the method according to the invention relates to a method in which a first data volume or a first data set and a second data volume or a second data set, respectively, are broken down into character strings; the character strings of the first data volume or of the first data set, respectively, and the character strings of the second data volume or the second data set, respectively, are compared in pairs in order to find character strings that, according to a predefined criterion, are similar and character strings of the second data volume that, according to the predetermined criterion, are not similar to any of the character strings of the first data volume are incorporated into the first data volume. In such a manner it is possible to combine different data volumes or data sets so that, after the combining, no duplicates are contained in the combined data volume. A first example of such a method is the automatic combining of computerized costumer files when two companies merge. Another application of this development of the method is the automatic combining of different merchandise stocks in a common warehouse. This problem occurs with the merging of two companies or with the centralizing of two different locations of a company. In this process it must be taken into account that the different warehouses store the same merchandise under different but similar names and that the type of merchandise in both warehouses coincides only in part, so that at least one warehouse stores merchandise that the other warehouse does not contain or has not contained. By applying the method according to the invention it is possible without cumbersome manual inventories to record the stocks of the warehouses, to track like but differently named merchandise and to combine them in a new, unified warehouse in such a manner that like merchandise is not stored under different names in different locations of the warehouse. The method can be carried out in such a manner that either matching character strings, or recognized as similar, are incorporated into the first data volume or that complete data sets that contain character strings recognized as similar are incorporated into the first data volume.

In this process, the first data volume or the first data sets, respectively, can be increased with data from the second data volume or the second data set, respectively, as set forth in claims 30 and 31.

Another advantageous development of the method is that from two character strings of a data volume that, according to a predetermined criterion, were evaluated as similar, one character string is removed from the data volume. In such a manner it is possible to automatically remove entries that were entered twice (duplicates) from an existing data volume, e.g., a data bank. This is even when they were not entered identically but to such a high degree of being a match that one can assume with great probability that, in spite of the different entries in the data volume, it deals with entries of the same content. A sufficiently high probability can be ensured in that for the degree of similarity or for the degree of being a match, respectively, a correspondingly high threshold is determined. The threshold can be obtained from experience. The removal of the duplicates can be automatically performed by the computer. However, by means of the method according to the invention, it is also possible to establish a list of possible duplicates, i.e., of character strings in which the numerical value of the similarity exceeds a predetermined threshold. The ascertaining of which of the entries in the list are actually duplicates can be either on a case by case basis or at demand. It is important, however, that the computer by establishing the list of the possible duplicates has already performed the greatest part of the work in finding the duplicates by extracting from the enormous number of the character strings to be compared those few ones that are possible duplicates having compiled them in a list.

The above-described method for the finding of possible duplicates can not only be carried out in such a manner that a character string, evaluated as a duplicate, is removed from the data volume but also in such a manner that a complete data set, e.g., the content of a line of a table, that contains the character string evaluated as a duplicate is removed from the data volume. The method for the finding and the removal of duplicates can be iteratively repeated until the examined data volume does no longer contain two character strings that, according to the predetermined criterion, are similar. An automatic and complete removal of duplicates is possible in such manner. An advantageous development of this method for the removal of duplicates consists in that of two data sets that contain character strings that, according to the predetermined criterion, are similar, the first of the two data sets is supplemented with data from the second data set that were not contained in the first data set. Only thereafter is the second data set removed from the data volume. This has the advantage that no loss of data occurs but that the first data set is increased with the data from the second data set that previously were not contained in the first data set.

The method according to the invention is especially appropriate for a fault-tolerant search within a large data volume for a predetermined character string or a data set containing the predetermined character string. In the case of a fault-tolerant search, a character string in a data volume, especially in a data bank, shall be found also if it is entered into the computer not identical, but tainted with a fault. The problem arises, e.g., if one wishes to order on-line through the Internet an item from a catalog without entering the description exactly as specified in the catalog but only similarly. In such a case, the method according to the invention makes it possible to find the right item. In this case, the character string or the data set containing such a character string, respectively, deals with the description of an item, e.g., merchandise, and the data volume, in which the descriptions are sought, deals with a catalog or another inventory listing that is stored in the computer or which the computer can access via an interface such as, e.g., an Internet access. The inventory listing specifies the inventory of a warehouse from which merchandise can be automatically called-up for sale and/or for distribution.

The method is also appropriate for the streamlining of manufacturing processes. In such a case, the inventory listing can contain the stock of a spare-parts warehouse of a company from which parts for the manufacturing process can be called-up. In a variant of the method, by entering at least a similar description of the desired part into the inventory listing it can be ascertained whether the desired part is on hand in the warehouse. In another development of the method, it is possible to request the part, if it is at hand, for manufacturing purposes and be preferably automatically called-up and transferred to the manufacturing plant.

Further, the method according to the invention can be advantageously used in order to compare the genetic makeup of organisms, especially microorganisms, whose genetic makeup was fully or partly decoded with the genetic makeup of other organisms in order to find out whether related organisms exist. This is of special importance when it deals with pathogenic agents that frequently mutate, facilitating their classification and the search for antidotes. In this type of application it is possible to compare character strings that represent gene sequences or nucleic acid sequences.

In general, the invention is especially appropriate for the automatic data maintenance in data banks.

Example

The invention shall be explained hereinafter by comparing the character strings "Bea Wax" and "B. Wachs."

The similarity and the weighted similarity of the existing associations are set forth in the below table:

| Variable | Association | Similarity | Similarity multiplied by the weight of the positions |
|---|---|---|---|
| A1 | B - B | 1 | 2 × 1 = 2 |
| A2 | Bea - B | 0.8 | 4 × 0.8 = 3.2 |
| A3 | 1.A - A | 1 | 2 × 1 = 2 |
| A4 | W - W | 1 | 2 × 1 = 2 |
| A5 | 2.A - A | 1 | 2 × 1 = 2 |
| A6 | X - CHS | 0.7 | 4 × 0.7 = 2.8 |

The values of the variable A1 to A6 determine to which extent is considered the hereto belonging association for the entire similarity. The value "0" means "not at all" and the value "1" means "completely".

Accordingly, a target function can be defined as $$Z = 2 \times A1 + 3.2 \times A2 + 2 \times A3 + 2 \times A4 + 2 \times A5 + 2.8 \times A6$$

The highest similarity value could be attained if one would assign the value of "1" to all variables. However, a boundary condition is that the associations shall not overlap.

By way of example, A1 and A2 overlap since both assign the first letter to the first character string. In order to avoid the overlapping, either A1 or A2 must be 1. We approximate this condition by the inequation $$A1 + A2 \leq 1$$

Herein are included many possibilities, e.g., that A1=0.4 and that A2=0.6. To allow such non integer values is meant when above, in connection with the approximate solution of the weighted set packing problem, it is referred to dropping the integrability condition (Engl., linear relaxation (cf [3])).

The inequalities are determined according to below scheme. For each position, the sum of the associations assigned to this position may not exceed the value of "1." This results in the below inequalities together with the target function $Z$,:

$A1+A2 \leq 1$ $A2+A3 \leq 1$ $A3+A5 \leq 1$ $A6 \leq 1$ $A4 \leq 1$ $Z = 2 \times A1 + 3.2 \times A2 + 2 \times A3 + 2 \times A4 + 2 \times A5 + 2.8 \times A6$ Therein we have omitted redundant inequalities.

The associations A2, A4, A5 and A6 constitute an association string.

The value of associations that constitute the beginning or the end of a fragment is lowered by means of a deduction. By way of example, the association A3 begins and ends at a word boundary. Therefore, from the value of the association A3 we deduct 0.5 both for the fragment beginning and the fragment end; i.e., that, in the target function, A3 is weighted only with the value "1" instead of "2."

For the association A6 it must be noted that, although this association represents a fragment end, but may not be a fragment beginning, depending on the value of A5. Thus, additional variants and conditions are inserted into the inequation system: below we designate as bridges the position pairs at which the associations begin and end. The position pair at which A5 ends and A6 begins is thus (5,3). Altogether, the result is the following bridges:

| | |
|---|---|
| B1 (3, 1) | (here ends A2 and begins A4) |
| B2 (4, 2) | (here ends A4 and begins A5) |
| B3 (5, 3) | (here ends A5 and begins A6) |

It can happen that several associations end or begin, respectively, at a bridge.

The sum of the bridges with the associations that begin or end at the bridge may not exceed 1, i.e.: according to below scheme, an inequation is inserted for each bridge B: (Sum of the associations that end at the bridge B)+value of the bridge B$\leq$1 (Sum of the associations that begin at the bridge B)+value of the bridge B$\leq$1

Thus, in our case, result the below inequations:

$B1+A3 \leq 1$ $B1+A4 \leq 1$ $B2+A4 \leq 1$ $B2+A5 \leq 1$ $B3+A5 \leq 1$ $B3+A6 \leq 1$ The inequations mean that the pertinent bridge is assigned the value of 1 only then, when neither an association ends at the corresponding bridge nor an association begins at that bridge. We weight the bridge in the target function with the double value of the fragment deduction but constantly reduce the total value of the target function by this value. The fragment deduction is added, instead of being substracted, to the associations that begin or end at the bridge.

As simplification, the fragment deduction is always 0.5. Thus, the below inequations are obtained:

$A1+A2 \leq 1$ $A2+A3 \leq 1$ $A3+A5 \leq 1$ $A6 \leq 1$ $A4 \leq 1$ $B1+A3 \leq 1$ $B1+A4 \leq 1$ $B2+A4 \leq 1$ $B2+A5 \leq 1$ $B3+A5 \leq 1$ $B3+A6 \leq 1$ and the target function:

$Z = (2-0.5-0.5) \times A1 + (3.2-0.5-0.5) \times A2 + (2.0-0.5+0.5) \times A3 + (2+0.5+0.5) \times A4 + (2+0.5+0.5) \times A5 + (2.80.5+0.5) \times A5 + (2.8+0.5+0.5) \times A6 + 1 \times B1 + 1 \times B3 - 3$ respectively $Z = 1 \times A1 + 2.2 \times A2 + 2 \times A3 + 3 \times A4 + 3 \times A5 + 2.8 \times A6 + 1 \times B1 + 1 \times B2 + 1 \times B3 - 3$ This system can now be solved, e.g., with the simplex alogarithm. The already normalized, i.e., optimal value, divided by the entire weight, as measure for the similarity of Bea Wax and B. Wachs results to be 0.78.

As explanation for the mentioned changes we consider the limiting cases, in which the values of the variants are "0" or "1." Should A1, A2 be cohesive associations with the value of 2, the fragment deduction is again 0.5. Thus:

| | | | |
|---|---|---|---|
| | $Z = (2 + 0.5 - 0.5) \times A1 + (2 + 0.5 - 0.5) \times A2 + (2 \times 0.5) \times B - 1$ | | |
| A1 | A2 | B | $Z = 2 \times A1 + 2 \times A2 + 1 * B - 1$ |
| 0 | 0 | 1 | 0 |
| 1 | 0 | 0 | 1 |
| 0 | 1 | 0 | 1 |
| 1 | 1 | 0 | 3 |

As it can be noted in lines 2 and 3, the value of the association is reduced by 1 (deduction for fragment beginning and end) since no cohesive association was chosen. In line 4 occur only the fragment deductions for the association string A1 and A2.

REFERENCES

[1] The Unicode Consortium. The Unicode Standard, Version 4.0.0 defined by: *The Unicode Standard*, Version 4.0 (Boston, Mass., Addison-Wesley, 2003. ISBN 0-321-18578-1).
[2] State-space-search: algorithms, complexity, extensions, and applications/Weix-iong-Zhang.—New York; Berlin; Heidelberg: Springer, 1999.—XVI, (Engl.) ISBN 0-387-98832-7

[3] Hromkovič Juraj; Algorithmics for Hard Problems; Springer, 2003; 2$^{nd}$ Edition; ISBN 3-540-44134-4
[4] Vanderbei, Robert J.; Linear Programming, Foundations and Extensions, Series: International Series in Operations Research & Management Science, Vol. 37, 2$^{nd}$ Edition, 2001, ISBN 0-7923-7342-1
[5] C. Roos, T. Terlaky, J.-Ph. Vial; Theory and Algorithms for Linear Optimization; Wiley, 2001; ISBN 0-471-95676-7

What is claimed is:

1. A computer-aided method for the automatic evaluation of the similarity of two character strings that are stored in a computer or to which the computer has access by means of an interface, the method comprising:
locating of associations in the character strings according to a rule stored in the computer;
evaluating located associations according to a first rule stored in the computer, whereby cohesive associations—hereinafter also designated as association strings—are evaluated higher for the similarity of the character strings than non-cohesive associations; and
deriving of a value, in particular a numerical value, as measure for the similarity of the two character strings from the evaluation of the sought associations according to a second rule stored in the computer, wherein the value for the similarity of the two character strings is constituted by the values of their not overlapping fragments, wherein a fragment is every association and any association string in the two character strings to be compared.

2. The method according to claim 1, wherein longer associations are evaluated higher than shorter associations.

3. The method according to claim 1, wherein, in the evaluation of the similarity of the character strings to be compared, the character strings are made up of as few fragments as possible each fragment being an association or an association string and in a remainder by characters from which no further associations can be formed.

4. The method according to claim 1, wherein to each association is assigned a numerical value as measure for the similarity of their associated components.

5. The method according to claim 4, wherein the associations are weighted according to their importance for the similarity of character strings.

6. The method according to claim 1, wherein characters that have or could have the same phonetic, symbolic or contents-wise significance in different character strings are treated to be equal or similar.

7. The method according to claim 1, wherein associations contained in the character strings are evaluated taking into consideration the values of the associations contained therein.

8. The method according to claim 7, wherein into the evaluation of an association string is entered the sum of the values of the associations contained therein.

9. The method according to claim 7, wherein the value of a fragment is increased or decreased depending on its position in the character string.

10. The method according to claim 9, wherein a fragment, that constitutes the beginning or the end of a word in at least one character string, as indication of the similarity of the character strings, is evaluated higher than a fragment that does not constitute either the beginning or the end of a word in the character string.

11. The method according to claim 10, wherein a fragment that constitutes either the beginning or the end of a word in both character strings is evaluated higher than a fragment that constitutes either the beginning or the end of a word in only one of the character strings.

12. The method according to claim 1, wherein the sum of the values of the fragments is added for the evaluation of the similarity of the character strings.

13. The method according to claim 12, wherein the sum of the values of the fragments is normalized in such a manner that it is assigned a fixed value in the case of matching character strings.

14. The method according to claim 1, wherein the similarity of two character strings is calculated according to a linear optimization method, in that a maximum of a numerical value that shows the similarity of the character strings is sought, the maximum value from a limiting condition that no character of the character strings to be compared may belong to more than one fragment.

15. The method according to claim 14, wherein, for the case that a fragment constitutes the beginning or the end of a word, limiting conditions and/or variants are introduced into the linear equations system.

16. The method according to claim 14, wherein an iteration process that converges from the bottom or the top, respectively, for the solving of the linear optimization problem is interrupted when the numerical value of the similarity reaches a threshold value or exceeds or falls below it, respectively.

17. The method according to claim 1, wherein the positions of characters in a character strings are numbered in sequence so that for each character in a character string a position number indicates unambiguously its position in the character string, and that for the determination of the similarity of two character strings the present characters are assigned to the positions occupied by the characters of the two character strings, and that especially the fragments are assigned to the positions that the characters of the two character strings constituting the fragments occupy, and that the positions are correspondingly evaluated.

18. The method according to claim 1, wherein in a first data volume a first data set that contains a first of two character strings that, according to a predetermined criterion, are similar is supplemented by data from a second data set that contains the second of the two similar character strings and is contained in a second data volume.

19. The method according to claim 1, wherein a first data volume or a first data set and a second data volume or a second data set, respectively, are broken down into character strings, that the character strings of the first data volume or the first data set, respectively, and the character strings of the second data volume or the second data set, respectively, are compared in pairs with each other in order to find character strings that, according to a predetermined criterion, are similar, and that character strings of the second data volume that, according to the predetermined criterion, are not similar to any of the character strings in the first data volume are incorporated into the first data volume.

20. The method according to claim 1, wherein from two character strings of a data volume that, according to a predetermined criterion, were evaluated as being similar, one character string is removed from the data volume.

* * * * *